Jan. 12, 1932.    N. C. LINDBERG ET AL    1,841,040
MANUFACTURE OF MONOAMMONIUM PHOSPHATE
Filed July 23, 1928
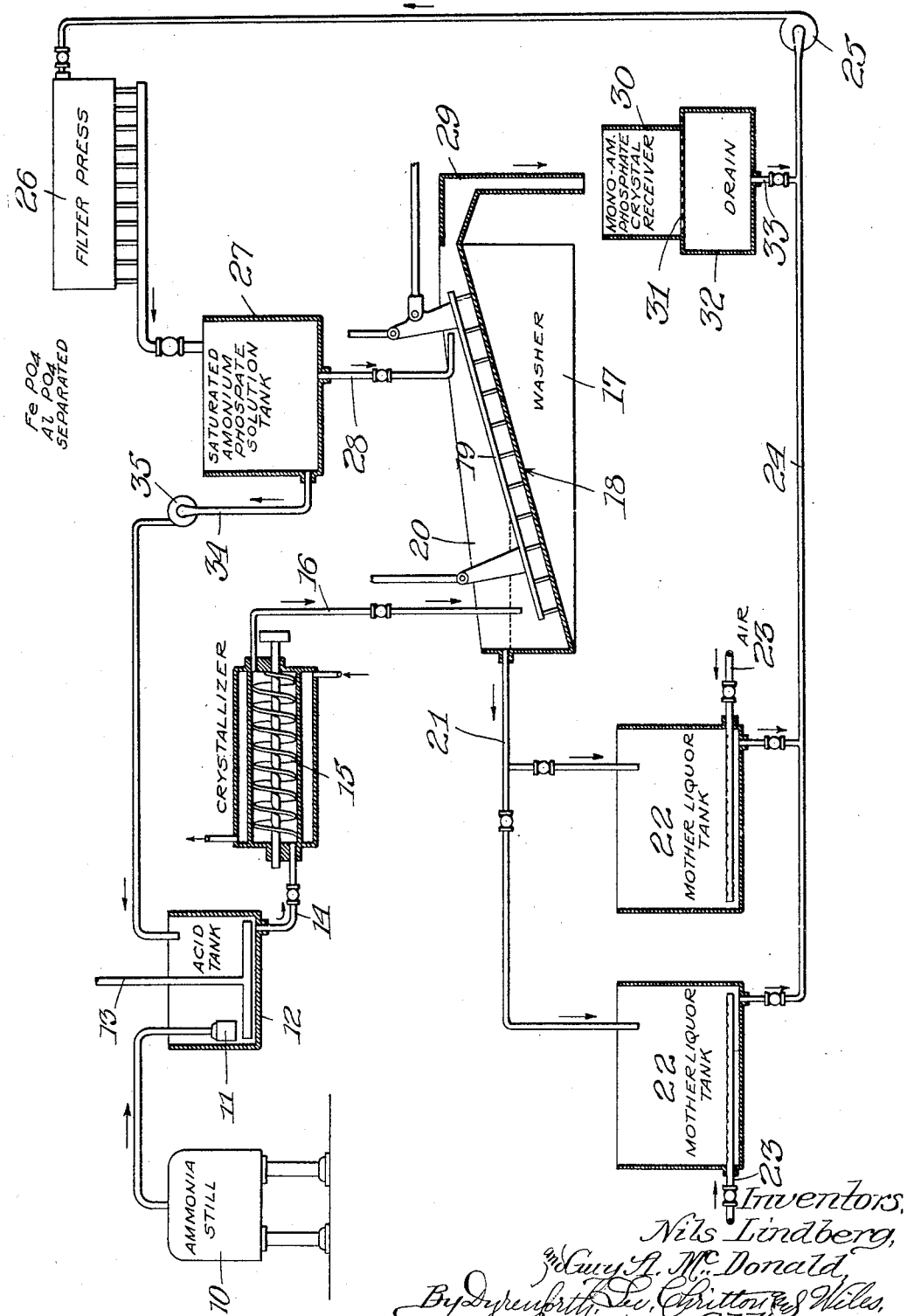

Patented Jan. 12, 1932

1,841,040

UNITED STATES PATENT OFFICE

NILS C. LINDBERG AND GUY A. McDONALD, OF CHICAGO HEIGHTS, ILLINOIS, ASSIGNORS TO VICTOR CHEMICAL WORKS, A CORPORATION OF ILLINOIS

MANUFACTURE OF MONOAMMONIUM PHOSPHATE

Application filed July 23, 1928. Serial No. 294,613.

This invention relates to the manufacture of phosphate compounds, and particularly mono-ammonium phosphate.

When ammonium phosphate is produced by reacting with ammonia upon weak phosphoric acid, that is, phosphoric acid of a gravity of about 30° Bé., such as acid obtained by the treatment of phosphate rock with sulphuric acid, the iron and aluminum phosphates are found to be relatively insoluble in the dilute solution of ammonium phosphate and can readily be removed therefrom by filtration before concentration and crystallization.

When using strong phosphoric acid, such as is obtained by the volatilization process, which may have a strength of about 75% and may contain around 0.5% of iron and aluminum phosphates, it is found that the ammonium phosphate solution produced by supplying ammonia to such acid appears to have a solvent action upon the aluminum and iron phosphates, so that they are not completely precipitated as in the case of weaker solutions. Ammonium phosphate crystals produced from such solutions are contaminated with iron and aluminum phosphates. The iron and aluminum phosphates could obviously be largely removed by diluting the ammonium phosphate solution so as to precipitate the iron and aluminum phosphates, filtering to remove them, concentrating and crystallizing. This procedure is expensive and, moreover, the concentration would necessarily be effected in lead vessels so that the product would become contaminated with lead.

It has now been discovered that if such strong solutions of ammonium phosphate are crystallized, the iron and aluminum phosphates can readily be removed from the ammonium phosphate crystals by mechanical washing. The iron and aluminum phosphates thus precipitated appear to be of amorphous character and differ substantially in density from the crystals of ammonium phospate which are formed simultaneously. On account of their lower density the iron and aluminum phosphates are readily removed from the ammonium phosphate crystals by a washing or flotation operation. Since the washing operation is mechanical in action, any liquid which will not injure the desired crystals may be employed. Generally, an aqueous liquid is employed, and preferably an aqueous liquid which will not excessively dissolve the desired ammonium phosphate crystals. On this account mother liquor, preferably filtered to remove undesired impurities, is highly suitable. The washing of the crystals can be effected in any desired manner and is preferably effected by causing the washing fluid to flow through the crystals while the latter are being moved progressively in the opposite direction. In this way, the iron and aluminum phosphates are floated off in the liquid stream.

The invention will more readily be understood from the following description in conjunction with the accompanying drawing which shows, diagrammatically, an apparatus suitable for the operation of the process.

Referring to the accompanying drawing, 10 is an ammonia still which is adapted to supply ammonia vapors to an outlet 11 in an acid tank 12, which is provided with a suitable stirrer 13 and a valved outlet 14. The valved outlet 14 leads into a suitable crystallizer 15, which is shown, by way of example, as an elongated chamber provided internally with a helical conveying screw and externally with the water jacket for the purpose of reducing the temperature to cause the formation of crystals. The valved outlet 16 of the crystallizer 15 feeds into a suitable apparatus 17 for washing the crystals. As shown in the drawing, a Dorr classifier may be employed, but it must be understood that any suitable apparatus which permits crystals to be moved in one direction, preferably somewhat upwardly, and permits washing liquid to flow through the crystals in the opposite direction, may be employed. For example, an upwardly sloping screw conveyor has given satisfactory results. The washer 17 comprises a sloping plane 18 and a rake 19 which is adapted to be operated so as to cause the crystals to move progressively up the plane. The pipe 16 preferably leads onto a lower part of the plane 18. The washer is provided with sides 20 so as to cause a body of liquid to collect about the lower part of the plane. An overflow 21 is provided which has valved connections leading into tanks 22.

The tanks 22 are provided with perforated pipes 23 whereby compressed air may be supplied thereinto for the purpose hereinafter to be described. From the lower end of the tanks 22, valved connections lead into a pipe 24 which is provided with a pump 25 and is connected to a suitable filter press 26. The outlet of the filter press leads into a tank 27 from which a valved outlet 28 leads to the top of the inclined plane 18. The upper end of the plane 18 is provided with a hopper 29 for the reception of washed crystals. The hopper 29 leads into a container 30 provided with a perforated bottom 31 which permits liquid to drain therethrough into a receptacle 32 which communicates by pipe 33 into pipe 24. A pipe 34 provided with a pump 35 leads from the bottom of the tank 27 into the tank 12.

In carrying out the process with strong phosphoric acid and ammonia vapor, it is necessary to dilute somewhat in order to obtain crystals in a form in which they may be readily handled. Owing to the heat of the reaction a certain amount of water is evaporated. According to the present process, the phosphoric acid is diluted with a suitable quantity of filtered mother liquor and conditions are adjusted so that approximately the same amount of water is evaporated during neutralization as is introduced with the acid and with the ammonia vapor. In this way, the formation and crystallization of the ammonium phosphate is effected without the necessity of any evaporating step.

Ammonium phosphate solution attacks iron to a certain extent and it is, therefore, preferred to avoid the employment of iron in the apparatus as far as possible. The method herein described provides means for the removal of such iron as may be dissolved.

The operation will be more readily understood from the following specific example: 940 lbs. of 75% phosphoric acid are supplied to the tank 12 and are diluted with about 81 gallons of cold saturated ammonium phosphate solution of a gravity of 24° Bé., which is supplied from tank 27 by pipe 34. Approximately 500 lbs. of 26% ammonia liquor is placed in still 10 and the ammonia is distilled into the mixture in the tank 12. The temperature of the finished batch is about 90° to 100° C., and the density is approximately 42° Bé. During the neutralization a considerable amount of evaporation takes place, so that the amount of mother liquor obtained from the batch is substantially the same as the amount of ammonium phosphate solution which was used to dilute the acid. The hot ammonium phosphate solution is now passed through the crystallizer 15, wherein it is cooled to about 20° to 25° C., agitated by the screw conveyor and fed thereby toward the outlet pipe 16 which carries it into the washing apparatus 17. In this apparatus, the crystals are moved upwardly over the inclined plane 18 and eventually pass into the hopper 29. In thus passing up the plane 18 they meet a countercurrent of saturated ammonium phosphate solution which is supplied by pipe 28. This solution mechanically washes a large percentage of the iron and aluminum phosphates, from the crystals, and these amorphous phosphates remain suspended in the solution and pass by pipe 21 to either of the tanks 22.

In the tanks 22, the mother liquor is treated for the oxidation of any ferrous phosphate which it may contain and which may have been derived from the attack of the ammonium phosphate solution on iron, or may have been contained in the original acid. This oxidation is effected by supplying compressed air by pipe 23, which causes agitation of the mother liquor and at the same time oxidizes the ferrous phosphate to ferric phosphate which is immediately precipitated. The mother liquor is then forced by pump 25 through the filter press 26, whereby the iron and aluminum phosphates are removed and substantially pure ammonium phosphate solution is passed into the tank 27 and used in diluting the acid in tank 12 and in washing the crystals in the washer 17 in the manner hereinbefore described.

From the hopper 29, the crystals pass into the container 30 and the adhering solution drips into receptacle 32 from which it passes by pipe 33 into the filter press 26.

By this method, the content of iron and aluminum phosphates in commercial ammonium phosphate derived from strong phosphoric acid can be reduced from about 0.75% to about 0.04%.

While the invention has been particularly described with relation to ammonium phosphate, it must be understood that it is not intended to be limited to the production of ammonium phosphate, since other phosphate compounds, such as sodium phosphate, etc., may be obtained in a similar high degree of purity by this process.

It must also be understood that many changes and modifications may be made in the apparatus and the method within the scope of the present invention. It is particularly to be understood that the details of the specific embodiment and example which have been employed to describe the invention are not intended to be limitative upon the scope of the invention, except in so far as included in the terms of the accompanying claims.

We claim:

1. The method of producing phosphate compounds substantially free from iron and aluminum impurities, which consists in crystallizing a solution of such compounds of such concentration as to contain such impurities in solution, whereby said impurities are thrown out of solution with the crystals, separating the crystals from the mother liquor and washing said crystals with mother liquor thereby mechanically removing iron and aluminum impurities therefrom.

2. The method of producing phosphate compounds substantially free from iron and aluminum impurities which consists in crystallizing a solution of such phosphates of such strength as to dissolve said iron and aluminum impurities, whereby the iron and aluminum impurities are thrown out with the crystals, separating the crystals from the mother liquor, filtering said mother liquor and washing said crystals with filtered mother liquor, thereby mechanically removing iron and aluminum impurities therefrom.

3. The method of producing phosphate compounds substantially free from iron and aluminum impurities which consists in crystallizing a solution of phosphates containing such impurities, separating the crystals from the mother liquor, oxidizing and filtering said mother liquor and washing said crystals with filtered mother liquor, thereby mechanically removing iron and aluminum impurities therefrom.

4. The method of producing phosphates substantially free from iron and aluminum compounds which consists in diluting strong phosphoric acid with aqueous liquid, forming phosphates from said acid, crystallizing the mixture, separating the phosphate crystals from the mother liquor, and washing the crystals to mechanically remove iron and aluminum compounds therefrom, the amount of aqueous liquid used to dilute the strong acid being such that the amount of water evaporated by the heat of the reaction is approximately equal that contained in the acid and introduced with the salt forming compound.

5. The method of producing phosphates substantially free from iron and aluminum compounds which consists in diluting strong phosphoric acid with mother liquor, forming phosphates from said acid, crystallizing the mixture, separating the phosphate crystals from the mother liquor, filtering said mother liquor and washing the crystals with filtered mother liquor thereby mechanically removing iron and aluminum compounds, the amount of mother liquor used to dilute the acid being such that the amount of water evaporated by the heat of the reaction is approximately equal that contained in the acid and introduced with the salt forming compound.

6. The method of producing mono-ammonium phosphate substantially free from iron and aluminum compounds, which consists in crystallizing a solution of such phosphates containing iron and aluminum compounds, which solution is of a strength such as to dissolve the iron and aluminum impurities, whereby the latter are thrown out of the solution with the phosphate crystals in segregable form, separating the crystals from the mother liquor and washing said crystals with mother liquor, thereby removing the precipitated iron and aluminum impurities mechanically.

7. The method of producing mono-ammonium phosphate substantially free from iron and aluminum compounds, which consists in crystallizing a solution of such phosphates containing iron and aluminum compounds, separating the crystals from the mother liquor, oxidizing and filtering said mother liquor and washing said crystals with filtered mother liquor.

8. The method of producing mono-ammonium phosphate substantially free from iron for crystallization of phosphate forming and aluminum compounds which consists in supplying ammonia to strong phosphoric acid containing iron and aluminum compounds to form phosphate of ammonia, the concentration of the phosphoric acid being such that the iron and aluminum impurities remain in solution, crystallizing said phosphates whereby the iron and aluminum compounds are thrown out with the crystals in segregable form and washing the crystals to remove the iron and aluminum compounds.

9. The method of producing mono-ammonium phosphate which consists in diluting strong phosphoric acid with aqueous liquid, supplying ammonia to said diluted acid, crystallizing the mixture, separating the mono-ammonium phosphate crystals from the mother liquor, washing the crystals with aqueous liquid to mechanically remove iron and aluminum compounds, the amount of aqueous liquid used to dilute the acid being such that the amount of water is evaporated by the heat of reaction is approximately equal to the amount of water contained in the acid and supplied with the ammonia.

10. The method of producing mono-ammonium phosphate which consists in diluting strong phosphoric acid with mother liquor, supplying ammonia to said diluted acid, crystallizing the mixture, separating the mono-ammonium phosphate crystals from the mother liquor, filtering said mother liquor and washing the crystals with filtered mother liquor thereby mechanically removing iron and aluminum compounds, the amount of mother liquor used to dilute the acid being such that the amount of water evaporated by the heat of the reaction is approximately equal to the amount of water contained in the acid and supplied with the ammonia.

11. The method of producing mono-ammonium phosphate which consists in diluting strong phosphoric acid with filtered mother liquor, supplying ammonia to said diluted acid, crystallizing the mixture, separating the mono-ammonium phosphate crystals from the mother liquor, oxidizing and filtering said mother liquor and washing the crystals with filtered mother liquor, the amount of filtered mother liquor used to dilute the acid being such that the amount of water evaporated by the heat of the reaction is approximately equal to that contained in the acid and supplied with the ammonia.

12. The method of producing mono-ammonium phosphate substantially free from iron and aluminum compounds, from strong phosphoric acid containing such compounds, which consists in diluting 940 lbs. by weight of 75% phosphoric acid with about 81 gallons of cold saturated ammonium phosphate solution, distilling the ammonia from about 500 lbs. of 26% ammonia into the mixture so that the temperature rises to about 90 to 100° C. thereby evaporating water in amount about equal to the water contained in the acid and introduced with the ammonia, cooling the mixture to about 20 to 25° C. and crystallizing the mono-ammonium phosphate, separating the mother liquor from the crystals, passing air through the mother liquor to oxidize ferrous compounds filtering the oxidized mother liquor and mechanically washing the crystals with filtered mother liquor.

13. The method of producing phosphates substantially free from iron and aluminum impurities which consists in diluting phosphoric acid containing such impurities and having a gravity substantially above 30° Bé. so as to provide sufficient liquid medium for crystallization of phosphates, forming phosphates from said acid, crystallizing the mixture, separating the crystals from the mother liquor, washing the crystals and thereby mechanically removing the iron and aluminum impurities from the phosphate crystals.

In testimony whereof we have hereunto set our hands and seals this 27th day of June, 1928.

NILS C. LINDBERG.
GUY A. McDONALD.